Figure 1:
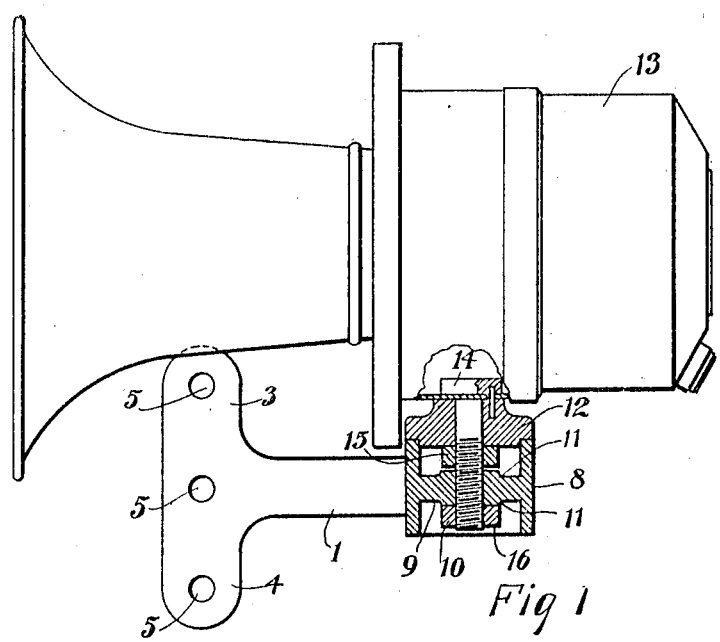

R. H. MANSON.
MOUNTING BRACKET.
APPLICATION FILED MAR. 29, 1912.

1,035,369.

Patented Aug. 13, 1912.

Witnesses
Ed. Spurr
Meta Schmittberger

Inventor
Ray H. Manson
By J. O. Redey
His Attorney

UNITED STATES PATENT OFFICE.

RAY H. MANSON, OF ELYRIA, OHIO, ASSIGNOR TO THE DEAN ELECTRIC COMPANY, OF ELYRIA, OHIO, A CORPORATION OF OHIO.

MOUNTING-BRACKET.

1,035,369.  Specification of Letters Patent.  Patented Aug. 13, 1912.

Original application filed August 14, 1911 Serial No. 643,829. Divided and this application filed March 29, 1912. Serial No. 687,143.

*To all whom it may concern:*

Be it known that I, RAY H. MANSON, a citizen of the United States, residing at Elyria, in the county of Lorain and State of Ohio, have invented certain new and useful Improvements in Mounting-Brackets; and I do hereby declare the following to be a full, clear, and exact description of the invention, such as will enable others skilled in the art to which it appertains to make and use the same.

My invention relates to mounting brackets which are especially adapted for the mounting of signaling devices to be employed upon vehicles, such as electric horns used on automobiles, it being my aim to produce such a bracket as can be readily adapted to any car. In mounting devices of this kind, it is desired that the resonator shall be forwardly directed, and since the surface upon which the horn is mounted may be parallel, perpendicular to, or at an angle to the direction of the axle, or at times this surface may be even horizontal, it is necessary to provide a mounting device which may be mounted upon surfaces in any of these positions. It is also desirable to provide a mounting device, such that the horn may be mounted on either side of the car on top of the wheel guards, or in other places about the machine, it being another object of my invention to provide a mounting device which will meet these requirements.

Other objects of my invention and the invention itself will be best understood by reference to the particular description when taken in connection with the form illustrated in the drawings.

This application is a division of my application #643,829, filed August 14, 1911.

Figure 2:
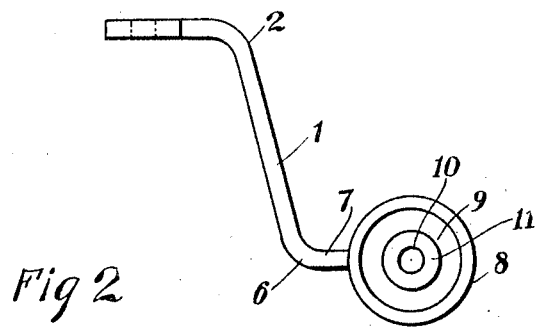

Figure 1 is a view of a bracket illustrating my invention, supporting an electric horn and partially sectioned. Fig. 2 is a plan of the form illustrated in Fig. 1.

Referring now to the drawing and the embodiment of the invention there shown, the main part or shank of the bracket is shown at 1. One end of this shank is adapted to be fastened to an automobile or other object, and in the form shown, the device is folded over at 2 and provided with a wing 3 and preferably with a second wing 4. The wings are perforated at 5 in order that they may be attached to the automobile or other object by some suitable means, such as screws. Of course, the bracket may be fastened in any suitable way to the automobile. The other end of the shank is bent over as shown at 6, forming a wing 7 upon which the mounting part of the bracket is fastened.

In order to meet the requirement that the mounting bracket shall be available to mount the horn on either side of the car, I make the mounting part two-faced; that is, I provide a plurality of bearing surfaces on said part, and may provide two such surfaces opposite each other, one at the bottom and the other at the top. The mounting bracket may then be reversed and mounted on the car with either bearing upward. This mounting part, in the form shown, consists of a turn-table like element which may be in the form of a cylinder, whose outer walls are shown at 8. A web 9 extends substantially perpendicular to the axis of the cylinder across the interior thereof, preferably near the center of the cylinder. The web is perforated at 10 and a boss 11 may be formed around the edges of the perforation on each side of the web. A bearing 12 is attached to the horn or instrument to be mounted upon the bracket. In the form shown, this bearing is fastened to the instrument 13 by some suitable means, such as a bolt 14 and nut 15. The bolt may extend through the perforation in the web, and a nut 16 mounted thereon, fastening the instrument 13 to the bracket and when tightened, locking it in position thereon. It will thus be seen that the instrument may be turned upon the turn-table in which event the bearing 12 coöperates with the complementary bearing on the edge of the cylinder 8, it being possible to swing the instrument 13 through an arc of 360 degrees. When the bracket is mounted upon an object, the instrument 13 may be mounted upon either side of the cylinder 8. The wings 3 and 4 may be fastened to a flat surface in any position, such as a horizontal or vertical surface, and the instrument 13 then turned upon the mounting until the resonator is directed forwardly. By this arrangement I save the trouble which is often caused by vehicle owners who desire that their horns shall be mounted in certain positions, such for example, as upon the dashboard, the wheel guards, the hoods or the body of an automobile, and who require the manufacturer of special mounting devices to connect the horn to the particular part of the machine upon which they desire to mount it.

It will be plain to those skilled in the art that numerous and extensive departures from the form and details of the embodiment illustrated may be made without departing from the spirit of the invention, this form being shown merely for the purpose of illustrating the invention.

What I desire to claim is:

1. In combination, a bracket having a shank, a flat wing upon one end of said shank by which the bracket may be connected to an object, a hollow cylindrical shaped bearing on the other end of said shank, a perforated web in said bearing, a boss on said web around the perforation, a complementary bearing on an instrument, means to connect said complementary bearing to said web, so that it coöperates with the bearing on the bracket, and means engaging said boss to lock said instrument in position upon said bearing.

2. In a device of the class described, the combination of a bracket having a shank, a flat wing upon one end of said shank, by which the bracket may be attached to an automobile or other object, the shank being bent substantially at right angles at the side of said bracket, and a hollow cylindrical bearing on the other end of said shank, a web in said bearing having an opening therein, a boss about said opening, said shank being bent substantially at right angles adjacent said bearing.

3. In a device of the class described, the combination of a bracket having a shank and a wing made of the same piece of metal, the wing being flat and serving to connect the bracket to an automobile or other object, the shank being bent at the junction of the shank and wing to form an obtuse angle a little greater than a right angle between the shank and wing, the shank being bent at the other end in the opposite direction to form an obtuse angle a little greater than a right angle, a cylindrical bearing surface on the end of the shank opposite the end connected to the wing, said cylindrical bearing having a bearing surface at each end and being symmetrical with respect to a central plane through the axis of the cylindrical perpendicular to said axis, a web in said cylindrical bearing perpendicular to the axis of the cylinder, said web being perforated and having a boss around the edge of the perforation upon each side of the web, a bearing surface on an instrument adapted to coöperate with either of the bearing surfaces on the bracket, means to connect said instrument to said web, and means engaging one of the bosses on said web to lock said instrument upon said bracket.

In testimony whereof, I affix my signature in the presence of two witnesses.

RAY H. MANSON.

Witnesses:
 A. D. T. LIBBY,
 F. O. RICHEY.